Nov. 1, 1932.    L. VITALBA    1,885,967
CHANGE SPEED MECHANISM
Filed Feb. 3, 1932

Inventor,
Leo Vitalba
By Sommers & Young
Attys.

Patented Nov. 1, 1932

1,885,967

UNITED STATES PATENT OFFICE

LEO VITALBA, OF TURIN, ITALY, ASSIGNOR TO FIAT SOCIETA ANONIMA, OF TURIN, ITALY

CHANGE SPEED MECHANISM

Application filed February 3, 1932, Serial No. 590,751, and in Italy November 3, 1931.

This invention relates to certain improvements in change speed mechanisms for automobiles and the like as described in U. S. Patent No. 1,719,032.

The object of these improvements is to simplify the construction of the mechanism and to ensure at the same time an exact, durable working wholly unaffected by the inevitable wear of the members in relative motion.

According to this invention each shifting fork of the change speed mechanism is fixedly connected with a sleeve slidably mounted on its guide rod which is in this case permanently secured to the box. For positively locking the sleeve (and its respective fork) in its end working position or positions, notches with edges cut at right angles are formed at the ends of the guide rod, and a resilient stop tooth carried by the sleeve snaps into said notches as soon as the sleeve reaches the end of its stroke. The locking thus obtained is unaffected by the thrusts axially imposed on the fork and for displacing the sleeve a member must be provided which releases the resilient tooth from the corresponding notch on the guide rod. For this purpose the resilient tooth is carried by a bell-crank lever pivoted to the sleeve in such manner that when the tooth is engaged by the notch, the remote arm of the lever projects into the groove co-operating with the lower end of the operating lever. Therefore, when the operating lever is acted upon for displacing the fork, the said lower end first swings the bell crank lever for releasing the resilient tooth from its notch and then displaces the sleeve.

For preventing the fork-carrying sleeve to be displaced from its intermediate position of rest under the action of shocks or vibrations, the guide rod is provided with a notch having inclined walls, into which the resilient tooth or one of the resilient teeth snaps as soon as the sleeve reaches the position of rest.

The tooth is released in the displacement in one direction by the raising of the tooth in the manner indicated above, and in the opposite direction by a slight stress on the operating lever in order to cause the tooth to ride over the inclined plane of the notch.

The accompanying drawing shows by way of example, a construction of the device according to this invention.

Figure 1:
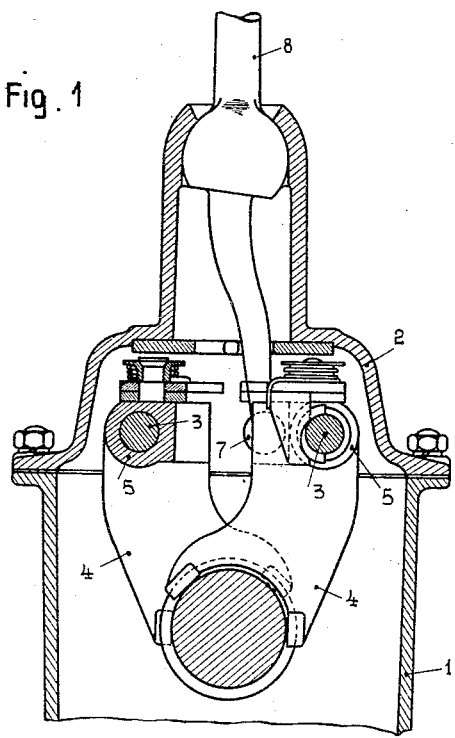
Figure 2:
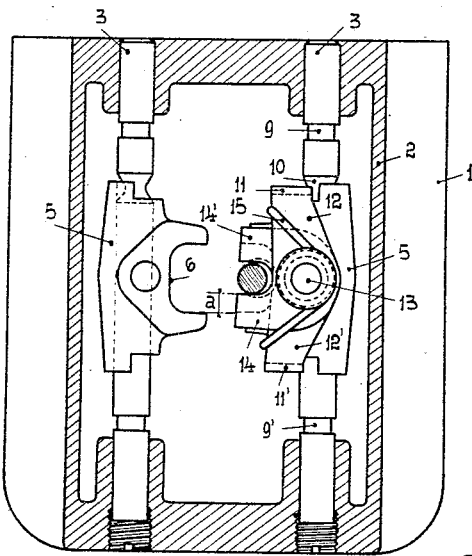

Figure 1 is a cross section and
Figure 2 is a plan view thereof.

Referring to the drawing, 1 denotes the change speed gear box, on the cover 2 whereof is mounted the operating device comprising the guide rods 3 secured to the cover and the forks 4 fixedly connected with sleeves 5 slidably mounted on the guide rods 3. The said sleeves are provided with recesses 6 adapted to engage the lower head 7 of the operating lever 8 in the usual manner.

Each of the guide rods 3 is provided with two annular end grooves 9 and $9^1$ with edges cut at right angles and with an intermediate groove 10 with inclined side walls.

The groove 9 is adapted to engage a tooth 11 carried by a bell crank lever 12 pivoted at 13 on the sleeve 5 and having an arm 14 which, when the tooth 11 is carried into engagement into one of the grooves, projects into the recess 6 by an extent —a—. The groove 9' is adapted to engage a tooth 11' of a second bell-crank lever 14' identical with the first, but mounted symmetrically thereto with respect to the middle axis of the recess 6. A common spring 15 wound on the pivot 13 serves for pressing the teeth 11 and 11' against the guide rod 3.

The working is as follows: Supposing the various parts of the device in the position shown in Fig. 2, i. e. with the fork 4 in the unclutched or rest position, and assuming it is desired to shift the fork towards the right, the head 7 is carried into the recess 6 on the sleeve 5 and the lever 8 is thereupon displaced to the left so as to force its head 7 to the right. By this operation the sleeve 5 is displaced to the right, causing the tooth 11 to rise over the inclined side of the groove 10 and to slide on the rod 3. When the tooth 11 reaches the groove 9 it snaps into said groove under the action of the spring 15, positively locking the sleeve (and fork) in this position corresponding to the clutched position of its respective movable pinion.

Any axial effort exerted on the gears in mesh cannot produce the axial displacement of the said pinion, this latter being held in position by its fork, which is locked in turn by the tooth 11. For unclutching the pinion, the operating lever is displaced in an opposite direction; the lower end of the operating lever abuts the arm 14 causing the lever 12 to swing and to release the tooth 11 from the groove 9 and thereupon the head 7 engaging with the side wall of the recess 6 displaces the sleeve till the tooth 11 is engaged by the groove 10. By shifting the operating lever further the sleeve is brought to the left for putting in another gear, which takes place when the tooth 11' snaps into the groove 9'.

The form and constructional details of the device can vary according to practical requirements without departing from the spirit of this invention.

What I claim is:

1. Device for locking movable pinion sets in change speed gears, comprising in combination with a control lever for said change speed gear, a pinion set shifting fork, a sleeve fixedly connected with said fork and having a seat engaging said control lever, a guide rod on which said sleeve is slidably mounted, a lever pivoted to said sleeve, an arm of which reaches into said seat, while the other arm is in the form of a tooth adapted to engage into notches formed in said guide rod, when said fork reaches the end of its stroke and a spring for keeping said tooth pressed against said guide rod.

2. Lock device for movable pinion sets in change speed gears comprising, in combination with a control lever for said change speed gear, a pinion set shifting fork, a sleeve fixedly connected with said fork and having a seat engaging said control lever, a guide rod on which said sleeve is slidably mounted and having annular grooves with edges at right angles at its ends and a notch with inclined walls in an intermediate position, a lever pivoted to said sleeve, an arm of which reaches into said seat, while the other is in the form of a tooth adapted to engage into said grooves and notch, when said fork reaches the end of its stroke, respectively its disconnected position and a spring for keeping said tooth pressed against said guide rods.

In testimony whereof, I hereunto affix my signature.

LEO VITALBA.